United States Patent [19]
Centofanti

[11] Patent Number: 4,751,395
[45] Date of Patent: Jun. 14, 1988

[54] SPILLAGE RETAINER FOR DUMP TRUCKS

[76] Inventor: Armando Centofanti, 5085 Kennedy, Lowellville, Ohio 44436

[21] Appl. No.: 59,022

[22] Filed: Jun. 8, 1987

[51] Int. Cl.[4] .............................................. B62D 25/00
[52] U.S. Cl. ........................................ 296/56; 296/15
[58] Field of Search ...................... 296/56, 50, 51, 52, 296/15, 184; 298/1 R, 7

[56] References Cited
U.S. PATENT DOCUMENTS

| | | | |
|---|---|---|---|
| 2,555,288 | 5/1951 | Kruger | 296/15 |
| 2,762,628 | 9/1956 | Terry | 298/7 |
| 2,878,053 | 3/1959 | Yuncker | 296/15 |
| 3,163,463 | 12/1964 | Femrite | 296/56 |
| 3,279,844 | 10/1966 | Cartwright | 296/56 |

Primary Examiner—Robert R. Song
Attorney, Agent, or Firm—Harpman & Harpman

[57] ABSTRACT

A spillage retainer for dump trucks to retain the trucks load in spaced relation to the tail gate. The retainer prevents spillage commonly occuring between the tail gate and the trucks bed due to tail gate wear and deterioration.

4 Claims, 1 Drawing Sheet

SPILLAGE RETAINER FOR DUMP TRUCKS

BACKGROUND OF THE INVENTION

1. Technical Field:

This invention relates to modifications to dump trucks to improve their carrying ability or load protection relative the interior of the dump truck bed and tail gate.

2. Description of Prior Art:

Prior Art devices of this type have relied on several different designs to improve and enhance the dumping action of the load, and positioning of the load within the dump truck beds, see for example U.S. Pat. Nos. 2,762,628, 2,878,053 and 3,279,844.

In U.S. Pat. No. 2,762,628 a dump truck with a material extender is disclosed having a curved spreader attachment secured to the truck just below the tail gate opening. The device provides for even distribution of material in the truck for controlled spreading.

U.S. Pat. No. 2,878,053 discloses a removable material guide for dump trucks that is comprised of a pair of oppositely disposed angular partitions removably secured in the opposite corners of the dump truck bed preventing the accumulation of carried material in the corners of the bed.

U.S. Pat. No. 3,279,844 discloses a tail gate extension for trucks wherein a base and opposite side walls are adjustably secured to the tail gate providing an extension that can be adjusted relative the tail gate position during dumping.

SUMMARY OF THE INVENTION

A spillage retainer for dump trucks that is positioned against the tail gate of the truck that restricts the loads position in spaced relation to the gate. The retainer is spaced above the trucks bed to allow for proper operation of the tail gate during dumping.

DESCRIPTION OF THE PREFERRED EMBODIMENT

Figure 1:
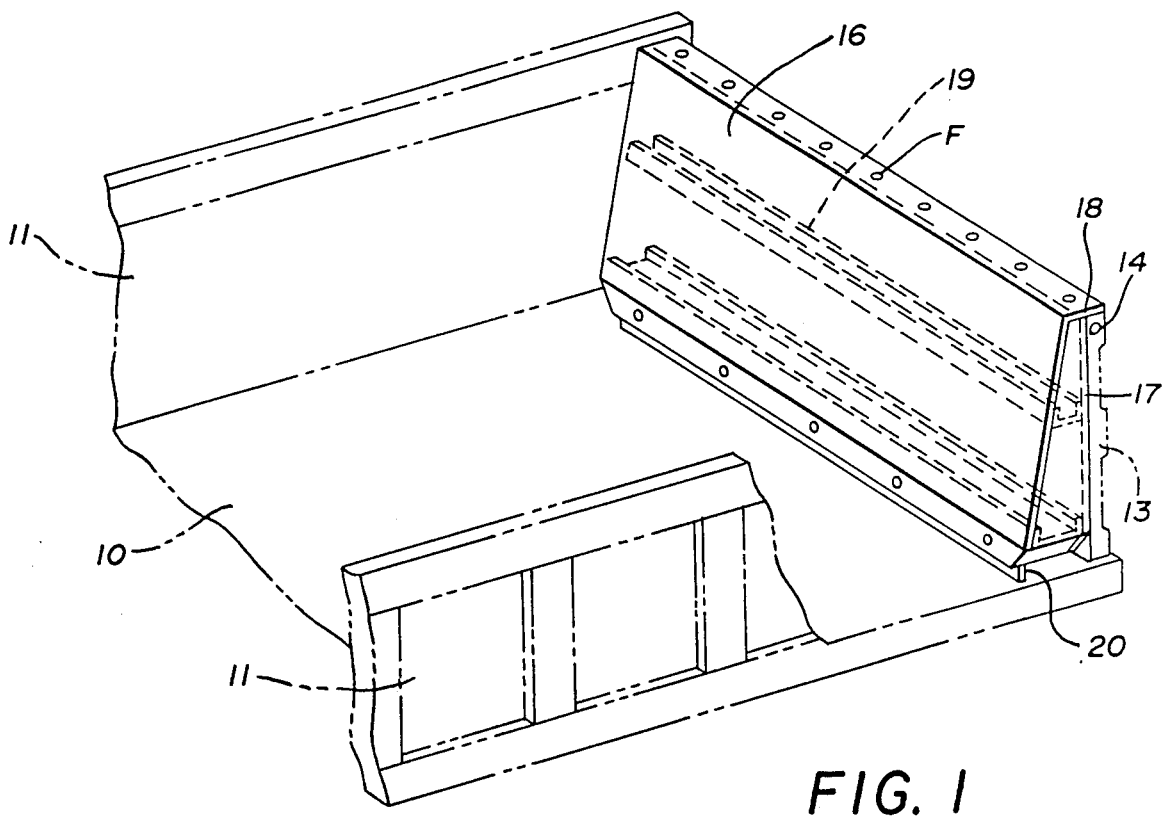
FIG. 1 is a perspective view of a portion of a dump truck with the spillage retainer in place.
Figure 2:
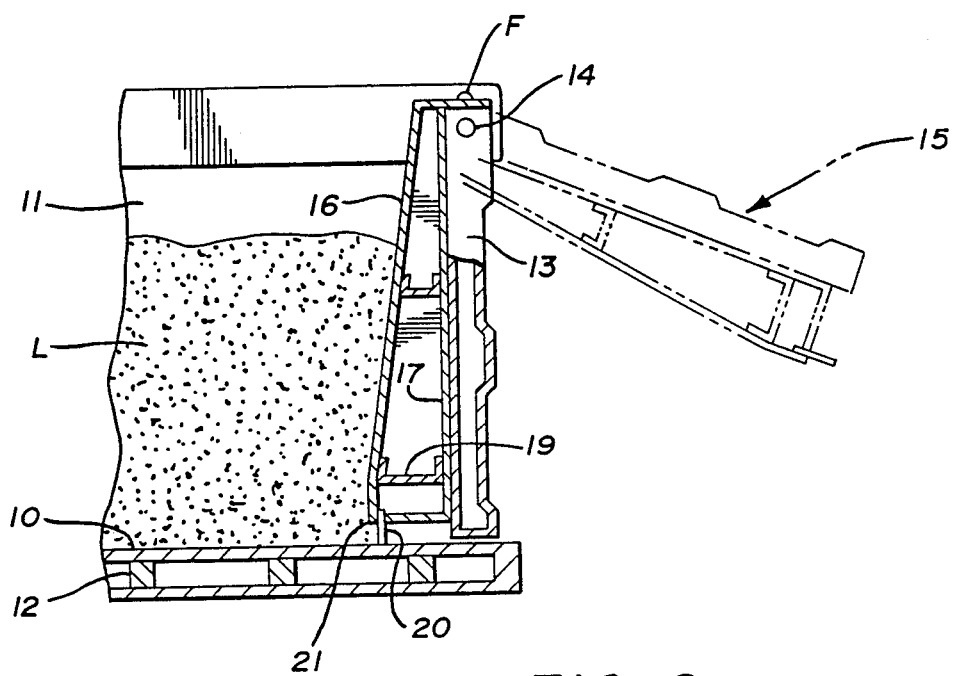
FIG. 2 is sectional view of the spillage retainer on the tail gate of a dump truck in operation.

A spillage retainer device for use in a dump truck can be seen in FIGS. 1-2 of the drawings. A portion of the dump truck show for illustration comprises a truck bed 10, side walls 11, bed support 12 and a tail gate 13. The tail gate 13 is pivoted at its uppermost portion by a pivot pin 14 and will swing on the pivot pin 14 from a closed position shown in FIG. 2 of the drawings to a open position shown in broken lines at 15.

The spillage retainer device is comprises of an angularly disposed front wall 16 and a back wall 17 with an outwardly extending elongated flange 17 along its entire upper edge. The wall 16 and the back wall 17 form two sides of a triangle when viewed in cross section, as seen in FIG. 2 of the drawings. A plurality of vertically spaced elongated support ribs 19 are positioned along and extend from the front wall 16 engaging the opposite side at the back wall 17 providing space support thereto. The spillage retainer device is secured to the tail gate 13 by a plurality of fasteners F in the elongated flange 18.

A resilient strip of rubber like material 20 is secured to the bottom edge of the front wall 16 along its entire lower edge 21, as best seen in FIGS. 1 and 2 of the drawings. The resilient rubber like strip 20 is of a height equal to that of the space between said angularly disposed front wall 16 and the truck bed 10 forming a sealing relationship therebetween while yet being flexible enough to allow for the tail gate 13 and its attached spillage retainer device to be pivoted outwardly as shown in FIG. 2 of the drawings in broken lines.

The spillage retainer device is positioned on the tail gate to allow for space clearance between the spillage retention device and the truck bed 10. In operation of load L in the dump truck will be prevented from direct contact with the tail gate 13 preventing uncontrolled and illegal spillage to occur between the tail gate 13 and the truck bed 10 which is common due to worn or rusted tail gates found on dump trucks in continuous use.

The angularly disposed front wall 16 distributes the load force generated by the load L and increases the load separation space adjacent the bottom of the tail gate 13 where spillage normally occurs.

Thus, it will be seen that a new and useful spillage retainer device has been illustrated and described and that various modifications may be made therein without departing from the spirit of the invention, therefore I claim:

1. In combination with a dump truck body having a bed, with a plurality of bed supports, upstanding walls extending from said bed, a tailgate pivotally secured between said walls, a spillage retainer device positioned on said tailgate and extending between said walls comprises an angularly disposed front wall, an elongated flange extending rearwardly from the upper edge of the front angularly disposed wall which inclined forwardly and downwardly, a plurality of spaced elongated support ribs extend from said front angularly disposed wall to a secondary wall, means for securing said spillage retainer device to said tailgate, means for distributing a load within said dump truck against said spillage device, and means for resiliently sealing said tailgate to said truck bed.

2. The combination of claim 1 wherein said means for securing said spillage retainer device to said tail gate comprises a plurality of fasteners extending through said elongated flange and by welding.

3. The combination of claim 1 wherein said means for distributing the load within said dump truck comprises the angular configuration of said spillage device having a space of known dimension between said load and said tail gate.

4. The combination of claim 1 wherein said means for resiliently sealing said tail gate to said truck bed comprises an elastic rubber strip extending along the bottom of said angularly disposed front wall and secured thereto in sealing relation to said truck bed.

* * * * *